May 29, 1934.  E. W. PAXTON ET AL  1,960,315
APPARATUS FOR AND METHOD OF MAKING WIRE GLASS
Filed Dec. 31, 1930   2 Sheets-Sheet 1

INVENTORS
Elisha W. Paxton
and Arthur W. Schmid
BY their ATTORNEY
H. C. Thiesing

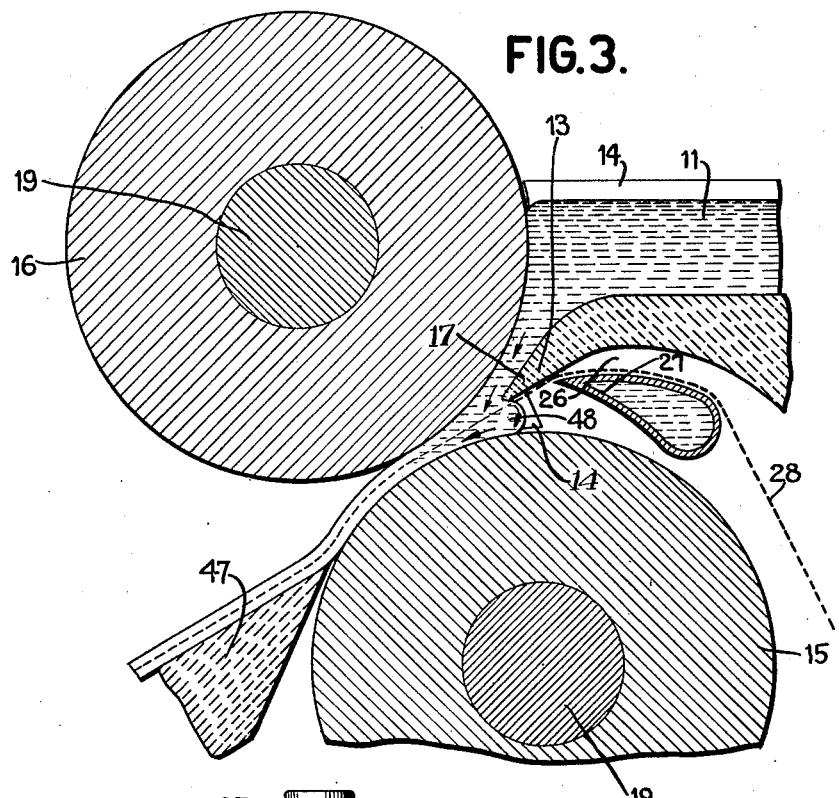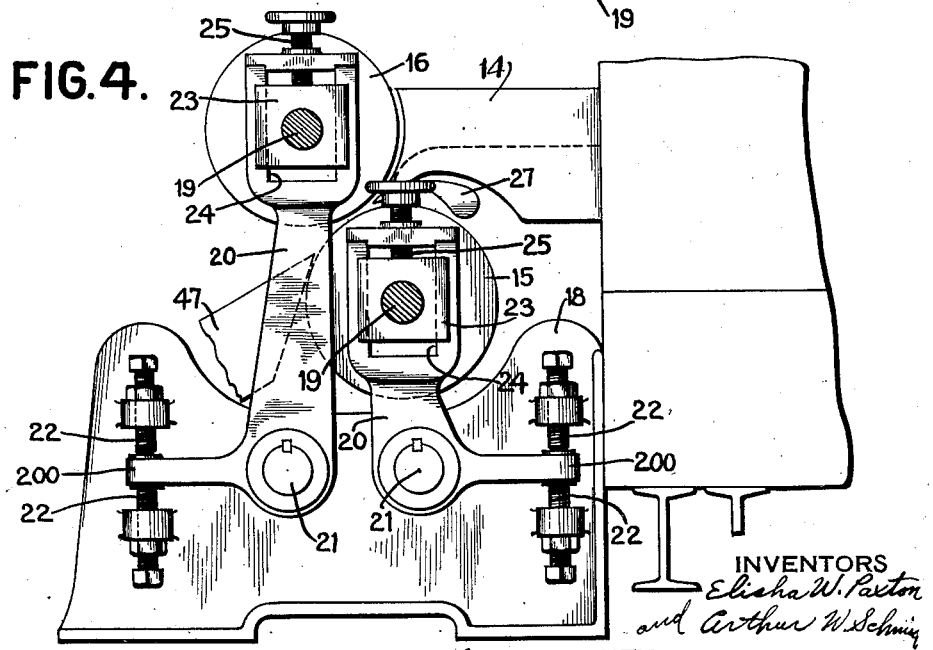

Patented May 29, 1934

1,960,315

UNITED STATES PATENT OFFICE 1,960,315

APPARATUS FOR AND METHOD OF MAKING WIRE GLASS

Elisha W. Paxton and Arthur W. Schmid, Washington, Pa., assignors, by mesne assignments, to Mississippi Glass Company, New York, N. Y., a corporation of New York Application December 31, 1930, Serial No. 505,729

18 Claims. (Cl. 49—32)

This invention relates to a process for the continuous production of wire glass and to suitable apparatus for carrying out the process.

Attempts have been made heretofore to produce a continuous sheet of glass having embedded therein a wire netting of suitable mesh but these attempts have not proved commercially successful due to various difficulties encountered. It has been found difficult or impossible in the conduct of previously proposed methods to prevent distortion of the wire netting as it is embedded in the glass and to insure the provision of an adequate layer of glass on both sides of the wire. Furthermore, prior proposals have led to the development of excessive air bubbles, "ream" or striæ and similar defects in the final product.

It has been a primary object of the present invention to enable the continuous production of wire glass having the wire netting substantially centrally located between the surfaces of the glass and in its original or undistorted condition, and having the glass free from objectionable defects such as air bubbles, ream and the like. In the accomplishment of this result the present invention has in view the bringing together of the glass and wire as near as possible to the forming rolls and to the point at which the materials are passed between the rolls and formed into the continuous sheet. As a result of bringing the glass and wire together in this manner the relative movement between the two is reduced to a minimum. It is not possible to completely eliminate relative movement between the glass and wire due to the necessity of squeezing or flattening out the mass of glass as it approaches and passes through the forming rolls. However, by so introducing the wire that it passes for only a short distance through glass of greater thickness than the finished sheet, the relative movement between them is materially decreased. The reduction in the relative movement between the glass and wire in accordance with the present invention also serves to prevent or reduce to a minimum the production of free air bubbles which normally results from the wiping off of the air bubbles from the wire mesh into the body of the sheet in the more rapid relative movement between the wire and glass, common to prior efforts to produce continuous wire glass. Such bubbles become much more objectionable when thus dissociated from the wires of the netting.

Another feature of the present invention is the provision of means for tensioning the wire netting just prior to its merging with the glass, the tension afforded by this means being variable to suit the particular requirements. The wire is introduced into the glass, furthermore, by a movement along a plane perpendicular to the plane of the roll axes and at a point substantially midway between these axes. Placing of the wire in a substantially central position within the finished sheet of glass is brought about by this method of handling the wire.

A still further feature of the invention is the maintenance of a small mass or body of glass below the wire at the point where the latter is brought into contact with the glass. This body of glass, furthermore, is given a rotary or spinning movement beneath the wire and serves to offset the chilling effect of the wire as it is merged with the glass. Under normal conditions the wire, due to its comparatively low temperature and good heat conductivity, will produce chilled spots in the glass, particularly at the points where the wires of the mesh are crossed and twisted. These chilled spots if not removed prior to rolling of the glass will result in the production of ream or striæ in the finish sheet. While preheating of the wire may serve to reduce the chilling effect somewhat, it cannot completely overcome this objectionable action. The wire at normal temperatures is quite readily distorted and when heated to anywhere near the temperature of the glass, would become so pliable that it would not hold its form during the movement of the same relative to the glass. Furthermore, when the wire is heated to any considerable degree it oxidizes very quickly and becomes undesirable for use. The provision of the rotating mass of glass beneath the wire serves to effect a reheating or rewelding of the chilled portions of the glass prior to rolling and thus eliminates the production of the objectionable defects mentioned.

Other objects and features of the invention will appear from the detailed description of an illustrative form of the same which will now be given in conjunction with the accompanying drawings, in which:

Fig. 3 is an enlarged detail view illustrating the action of the rollers, and

Fig. 4 is a side elevational view illustrating the adjustable mounting of the rollers.

Figure 1:
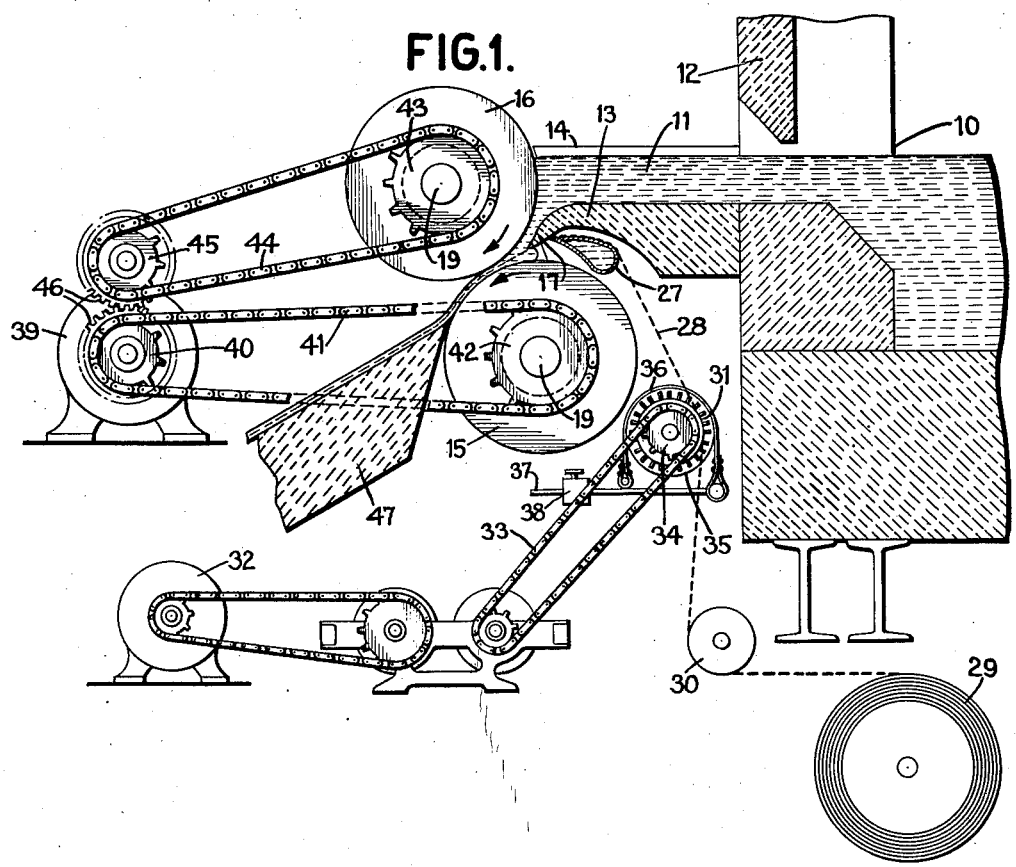
Fig. 1 is an elevational view partly in section and largely schematic of a furnace and other apparatus capable of forming a continuous sheet of wire glass in accordance with the present invention.
Figure 2:
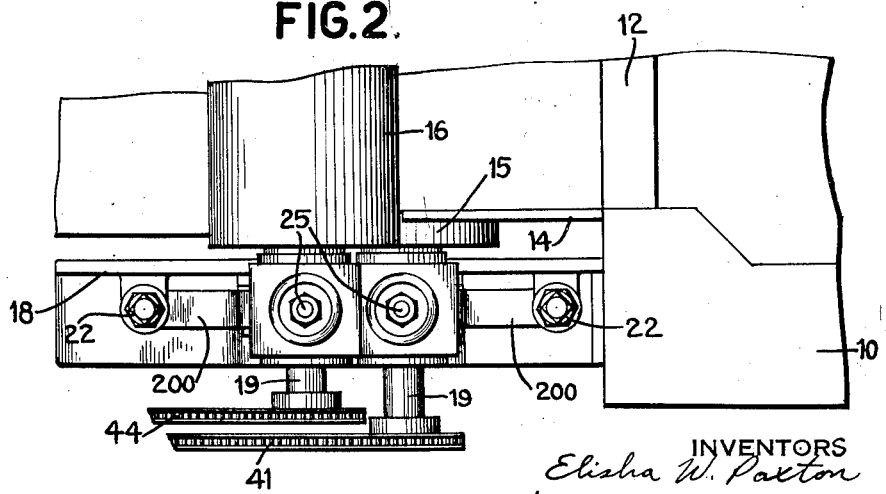
Fig. 2 is a partial plan view of the apparatus shown in Fig. 1.

Referring now to the drawings, a furnace 10 of any suitable construction may be employed. Glass 11 will be maintained in a molten state within the furnace to the level indicated and will be heated to a temperature at which it will have a desirable viscosity. A gate 12 may normally prevent the discharge of the glass and may be raised when the glass is to be fed to the sheet rolling equipment, to be explained.

At the discharge opening of the furnace there may be provided a lip 13, formed of suitable refractory material, having a flat upper surface in line with the lower edge of the opening. Guide members 14, formed of metal or refractory material capable of withstanding the heat and action of the molten glass, are provided on the upper surface of the lip at the sides of the same to confine the glass as it flows over the lip. One or both of the guides may be made adjustable, if desired, in order to control the width of the sheet of glass to be produced. At the same time provision should also be made for reducing the width of the discharge opening from the furnace or for suitably directing the glass from this opening to the space between the guides.

A pair of forming rollers 15 and 16 may be mounted just beyond the outer end of the lip 13. The axis of the lower roll 15 is preferably located substantially directly below the outer end of the lip while the axes of the two rolls are preferably maintained in such relation that a plane passing through them will be at an angle of about 30° to the vertical. This angle may be made greater or less, if desired, but approximately the angle specified is considered to be preferable. By the disposition of the rolls in the way indicated, a greater head is provided on the glass at the roll pass. This brings about a desirable speeding up of the operation of the apparatus due to the increased rate of flow which it makes possible. It is necessary to the proper operation of the system that the glass should have a rather definite viscosity corresponding with a fairly definite practical working temperature. While the glass is heated to somewhat more than a mere drawing temperature, the viscosity under the appropriate working conditions is so great that the flow of the glass through the wire mesh is not very rapid and any means which may be suitably employed to increase the rate of flow is desirable. The more rapid flow not only has the desirable effect of increasing the speed of production of the glass, but it also reduces the undesirable chilling effect and the accompanying production of ream or striæ. Too long a contact of the glass with the surface of the roll 16 is also objectionable on account of the tendency to produce an excessively thick layer of chilled glass adjacent to the roll which when drawn through the roll would force the wire netting down toward the lower surface of the finished sheet. An increase in the temperature of the glass flowing over the lip would result in an increased rate of flow due to reduction of viscosity but this at the same time would result in greater expansion of the air drawn from the interstices of the netting and the consequent production of objectionable bubbles in the sheet of glass. The provision of a greater head on the glass at the point where it passes through the rolls, in the manner previously explained, has the desired effect.

In order to properly direct the glass between the pair of forming rolls it is necessary to provide the lip 13 with a downward extension 17. This should extend as nearly as possible to the midportion of the plane which passes through the axes of the rolls. It is necessary, however, to provide a sufficient space between the lip end 17 and the roll 16 to permit an appropriate flow of the glass to the passage between the rolls. This of necessity requires termination of the lip at a point at a slight distance from the plane passing through the axes of the rolls.

Preferably the lip and the rolls are made relatively adjustable so that the passage between them may be varied somewhat to suit the requirements of a particular operation. For this purpose the rolls are preferably adjustably mounted on a suitable base or standard 18. Each roll may be made independently adjustable in any direction. This may be accomplished by mounting each roll, through its trunnions 19, on a pair of arms 20 which may be secured to shafts or rods 21 extending across the bottom of the base member 18. For rocking the pairs of arms 20 that support the opposite ends of the rollers 15 and 16, one of the arms of each pair may be provided with an extension 200 which may be engaged on opposite sides by set-screws 22 or the like which may serve to hold the arms in any desired angular position. At the same time the roller trunnions may be carried by blocks 23 which are adjustable longitudinally in slots 24 in the arms. A feed screw 25 may, for example, be employed to adjust the position of each of the blocks in the slots 24. The various adjustment screws may be provided with squared or knurled heads or wheels to permit them to be readily adjusted. If desired the feed screws 25 related to the opposite ends of the same roll may be connected for joint adjustment by a chain and sprocket construction. Any other suitable means may be provided in lieu of that illustrated for permitting the desired adjustments. It is desirable, however, that the apparatus be so constructed that the rolls may not only be adjusted relatively to the lip end 17 but also relative to each other to provide a larger or smaller passage between the rolls to vary the thickness of the sheet produced and to permit a change in the angle of the plane passing through the axes of the two rolls.

As shown in the drawings the end 17 of the lip should preferably have a thin beaklike form providing a cutout pocket 26 on its under side in which may be located a suitable guide member 27. The wire netting 28 which is to be embedded in the glass may be led over the guide 27 and under the end 17 of the lip, either in contact therewith or close to the same. Close to the end of the lip the wire enters the mass of glass which will accumulate to a certain extent under the lip. The quantity of glass which is thus forced through the wire netting and under the lip may be regulated by the control of the feed of the glass to the rolls, the rate at which it is squeezed between the rolls, by the distance from roll 15 to lip 17, and by the temperature and viscosity of the glass.

In order that the chilling effect of the netting may be reduced as far as possible it may be preheated in any suitable way. For example an electric current may be passed across the netting and, due to the resistance of the latter, heat may be generated to any desired degree. If desired a heating fluid such as steam or hot water or other hot liquid or gas may be passed through the guide element 27 so that as the wire passes over it the wire will be suitably heated. The guide 27 is preferably adjustably mounted beneath the lip 13.

The wire netting may be supplied from a large roll 29 from which it may be led around a guide roller 30 and over a suitable tensioning drum 31 before being passed over the guide 27. Around the periphery of the roll or drum 31 there may be provided a series of spikes which are adapted to fit into the meshes of the netting and provide a uniform tension on the same and a uniform feeding of the wire into the molten glass. The roll 31 may be driven in any suitable way as by means of a motor 32 connected by means of a belt or chain 33 with a pulley or sprocket wheel 34 secured to the shaft which supports the roll. If desired a variable speed transmission mechanism may be interposed between the motor and the roll shaft as shown. A variation in the speed of rotation of the roll and the tension imparted thereby to the wire may be brought about by the use of a suitable brake which may afford a resistance of variable magnitude. An ordinary prony brake may be used, for example, including the provision of a brake drum 35, a friction strap 36 and a tension arm 37 having a variable weight or load 38 connected therewith. By varying the force applied by the weight 38 to the strap the braking effect may be varied and the action of the tension roll may be correspondingly modified. This may be used either in lieu of or in addition to the variable speed transmission mechanism between the motor and the roll. It will be apparent that a certain amount of tension on the netting will be provided as a result of dragging it over the guide 27. This tension may be modified to any desired extent by the feeding devices mentioned, it being important merely that the netting have sufficient tension to sustain it against the downward force of the molten glass.

Any suitable means may be provided for driving the forming rollers 15 and 16. This may include a motor 39 having a sprocket wheel 40 mounted on its shaft. A chain 41 cooperating with a sprocket 42 carried by one of the trunnions of the roller 15 may serve to drive the latter. In order to rotate the roller 16 in the opposite direction a sprocket 43 mounted on one of its trunnions may be connected by a chain 44 with a sprocket 45 which is connected by a pair of gears 46 for rotation in a direction opposite to that of the sprocket 40. The rollers will be rotated in the direction indicated by the arrows in Figure 1 so that the glass will be drawn between them and squeezed into the desired thickness. The sheet of glass thus formed may tend to remain on the surface of the lower roll 15 until it reaches the tip of a dead plate 47 which serves to pick off the continuous strip and pass it, for example, to the live rolls of the annealing lehr.

The operation of the apparatus for the continuous production of wire glass is believed to be apparent from the foregoing but may be summarized as follows: When the apparatus is set into operation the cut-off gate 12 is raised and the glass 11 permitted to flow over the lip 13. It is directed by the end 17 of the lip downwardly toward the gap between the rollers 15 and 16. As previously pointed out, it is desirable that the tip of the lip should approach as nearly as possible to a point midway between the axes of the two rolls 15 and 16. This, in conjunction with the feeding of the wire netting in the manner explained, necessitates the formation of a very thin ledge at the end of the lip and requires the use of a strong and durable form of refractory material and one which will withstand the continuous flow of the molten glass over its surface. The wire netting is fed under suitable tension and at the appropriate rate by means of the spiked tension roller 31 from the supply roll 29 over the guide 27, which may serve to preheat the wire, and under the end of the lip, either in or out of contact with the same, into the mass of glass to be drawn with the latter between the forming rolls. The arrangement is such that the wire is fed, as it leaves the end of the lip, in a direction perpendicular to the plane joining the axes of the rolls and midway between these axes. This places the wire substantially midway between the upper and lower surfaces of the finished sheet of glass. Due to the fact that the wire is introduced into the glass at only a very short distance from the point at which the glass is squeezed into its final thickness there is very little relative movement between the two and hence very little tendency to distort the wire and produce bubbles in the glass.

In a practical, commercial embodiment of the invention the rolls 15 and 16 may suitably be 12 inches in diameter and so arranged that the plane passing through their axes is at 30° to the vertical, although it is to be understood that the invention is not limited to the use of rolls of the diameter mentioned nor arranged at the angle specified. Suitable means may be provided for cooling the rolls 15 and 16 so that as they rotate in contact with the body of glass from the lip a film or layer of the glass will be cooled sufficiently to be drawn with the rollers and squeezed into the desired form. Steam or air or similar media may be blown into or against the rollers to effect the desired cooling.

Beneath the end of the lip 13 and on the surface of the lower roller there is collected a mass of glass 48 which, due to the rotation of the roll 15, is given a constant whirling movement as indicated by the arrows in Figure 3. This mass of glass serves to reheat any portions of the glass which may have become chilled by contact with the wire netting, particularly where the wires are crossed. The production of ream or striæ is thus reduced to a minimum. It will be noted that the lip 13 is so spaced from both of the rolls as to form two passages or orifices, one of which, through which the glass flows, may be termed the main passage and the other, through which the wire is introduced, may be termed an auxiliary passage. The tension on the netting must be sufficient to resist the transverse force of the glass as it flows through the netting from the main to the auxiliary passage. Preferably the peripheral speed of the rolls 15 and 16 will be the same as that of the tension roll 31 but either may be decreased with respect to the other to suit the particular circumstances.

While one admirable form of the invention has been disclosed in considerable detail and various dimensions and conditions have been mentioned as particularly suitable it will be understood that various modifications of the construction, arrangement and mode of operation may be made without departing from the general spirit and scope of the invention as defined by the appended claims.

What we claim is:
1. A method of making wire glass with the wire unexposed at either surface which comprises feeding molten glass over a lip directly between a pair of forming rolls, maintaining a body of molten glass beneath said lip, feeding wire netting into the glass at a point adjacent the roll pass and substantially in a plane perpendicular to the plane passing through the axes of the rolls, and holding the netting spaced from both the rolls.

2. A method of making wire glass with the wire unexposed at either surface which comprises feeding molten glass in a single undivided stream directly from a bulk supply between a pair of spaced forming rolls of substantially the same size and feeding wire netting into said glass substantially along a plane perpendicular to the plane passing through the axes of said rolls and at a point spaced from both rolls and between said plane passing through the axes and a substantially parallel plane tangent to the rolls.

3. A method of making wire glass which comprises feeding molten glass in a single undivided stream directly from a bulk supply between a pair of spaced forming rolls, feeding wire netting into said glass substantially along a plane perpendicular to the plane passing through the axes of said rolls and at a point adjacent said rolls within the converging passage between the rolls and midway between the same, and maintaining a tension on said wire netting as it is fed.

4. In apparatus of the class described a pair of spaced rolls, a furnace, a lip for conducting molten glass from said furnace to a point substantially midway between the outer surfaces of said rolls, and means disposed beneath said lip for feeding wire netting and introducing the same into the glass along a plane substantially midway between said rolls and out of contact therewith from a point beneath said lip.

5. In apparatus of the class described a pair of spaced rolls having their axes in a plane at an acute angle to the vertical, a furnace, means for feeding molten glass from said furnace to the space between said rolls, said means dividing the space between said rolls into a main passage above and an auxiliary passage below said means, and means for feeding wire into said glass through the auxiliary passage substantially along a plane perpendicular to said first mentioned plane and at a point substantially midway between said spaced rolls.

6. In apparatus of the class described a pair of spaced rolls having their axes in a plane at an acute angle to the vertical, a furnace, means for feeding molten glass from said furnace to the space between said rolls, and means disposed beneath said glass feeding means out of contact with the molten glass for feeding wire into said glass substantially along a plane perpendicular to said first mentioned plane and at a point substantially midway between said spaced rolls, said wire feeding means including a spiked tensioning roll with means for driving the same at variable speeds.

7. In apparatus of the class described a pair of spaced forming rolls, means for rotating the same at variable speeds, means for feeding glass between said rolls, means beneath said feeding means for delivering wire netting into the glass just in advance of the bight of said rolls out of contact with the rolls and in direct line with the pass between the rolls, a tension feed roll over which said wire is fed before delivery into said glass, and means for driving said tension roll at variable speeds.

8. A method of making commercial wire glass with the wire unexposed at either surface which comprises continuously feeding a strip of wire netting under tension directly into the bight of a pair of spaced rolls and out of contact therewith, one of the rolls being above and in advance of the other, continuously rotating said rolls, and feeding molten glass directly from a bulk supply and without preliminary formation to the space between said rolls from the upper side thereof and through said wire netting to produce a whirling mass of glass between the netting and the lower roll.

9. In apparatus of the class described a pair of spaced forming rolls of substantially the same diameter, means for rotating said rolls, means for feeding a continuous strip of wire netting and introducing the same into the glass along a plane substantially midway between the rolls, and a lip for delivering molten glass between said rolls and through said netting, said lip having an angled discharge end terminating adjacent the plane of the axes of said rolls and substantially in line with the space between the rolls, said lip end being spaced from both said rolls to permit molten glass to enter between said end and each roll.

10. In apparatus of the class described a pair of spaced forming rolls each substantially one foot in diameter, the plane of the axes of said rolls being inclined at substantially 30° to the vertical, means for rotating said rolls, means for directing molten glass without preliminary formation into a sheet into the space between said rolls from the upper side thereof and substantially along a plane perpendicular to the plane of the roll axes, and means for feeding and suspending a continuous strip of wire netting under longitudinal tension to sustain said wire netting between said rolls against the weight and viscosity of said molten glass.

11. In apparatus of the class described a pair of spaced forming rolls of substantially the same diameter, one above and in advance of the other, means for rotating the same at variable speeds, means for supporting and feeding molten glass downwardly toward the roll-pass between said rolls to a point over the axis of the lower roll, means disposed below said supporting and feeding means and out of contact with the molten glass for delivering wire netting into the glass after it leaves said supporting and feeding means and just in advance of said roll-pass, and means for applying a tension to said netting as it is fed to sustain it out of contact with the rolls in tensioned suspension against the weight and viscosity of said downwardly moving glass.

12. Apparatus for making wire glass which comprises a pair of rolls, a lip arranged in the converging space between said rolls and adapted to form with the surfaces of said rolls a main passage and an auxiliary passage to the pass between said rolls, said lip extending at least to a point over the axis of the lower roll, means for feeding molten glass to the main passage, and means for introducing reinforcing wire into the glass through the auxiliary passage and out of contact with the rolls.

13. A method of making a continuous sheet of commercial wire glass in a single sheet forming pass which comprises feeding molten glass downward toward and partially through a continuously supplied strip of wire netting freely suspended in a plane between its initial point of completed incorporation with said molten glass substantially at a roll-pass and a supporting member out of contact with the glass; said strip of wire netting being suitably and variably tensioned longitudinally to sustain it against the downwardly advancing load of said molten glass.

14. A method of making a continuous sheet of commercial wire glass which comprises the incorporation of a continuous strip of longitudinally tensioned and freely suspended wire netting with a mass of glass continuously flowing over a stationary support at a point beyond the stationary support of said mass of glass, the said glass with incorporated wire netting then proceeding directly through a roll forming pass without preliminary partial formation of a sheet with the wire embedded therein.

15. Apparatus for making a continuous sheet of wire glass comprising a pair of rolls arranged one above and in advance of the other, and a lip member providing a main glass-flowing orifice adjacent the roll-pass, the long sides or walls of said orifice being formed by one of the rolls and said lip member respectively; an auxiliary or expansion orifice being formed between said supporting lip member and the other of the rolls forming said pass, and means for introducing a continuous strip of wire netting between the rolls and out of contact therewith and subjecting the netting to suitable longitudinal tension, and a second lip member disposed beneath the first out of contact with the glass for suspending the netting so that the point of introduction of the wire netting lies within the thickness of said auxiliary or expansion orifice.

16. A method of making a continuous sheet of commercial wire glass in a single sheet forming pass, which consists in flowing molten glass toward a roll-pass through a main slot formed by the surfaces of one of the rolls and a stationary flow-lip, and continuously introducing a strip of wire netting into the main flow out of contact with the rolls and the flow lip through an auxiliary slot formed by the surfaces of said flow-lip and the other roll.

17. A method of making wire glass with the wire unexposed at either surface which comprises feeding molten glass over a lip directly without preliminary formation into a sheet to the pass between a pair of forming rolls arranged one above and in advance of the other, maintaining a body of molten glass beneath said lip, feeding wire netting into the glass beneath said lip, and maintaining the netting out of contact with both rolls.

18. A method of making wire glass with the wire unexposed at either surface which comprises feeding molten glass over a lip directly to the pass between a pair of forming rolls without preliminary formation into a sheet, maintaining a body of molten glass beneath said lip, feeding wire directly into said pass from beneath said lip out of contact with both rolls, and heating said wire prior to feeding it into said glass.

ELISHA W. PAXTON.
ARTHUR W. SCHMID.